(12) United States Patent
Yamamoto et al.

(10) Patent No.: US 11,750,757 B2
(45) Date of Patent: Sep. 5, 2023

(54) INFORMATION PROCESSING APPARATUS, INFORMATION PROCESSING SYSTEM, AND NON-TRANSITORY COMPUTER READABLE MEDIUM FOR NOTIFYING CONTACTS OF RECEIPT OF A FACSIMILE DOCUMENT

(71) Applicant: FUJIFILM Business Innovation Corp., Tokyo (JP)

(72) Inventors: Takuma Yamamoto, Kanagawa (JP); Kohei Kaibara, Kanagawa (JP); Masakazu Ketsuka, Kanagawa (JP); Mitsuru Sato, Kanagawa (JP); Toru Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/645,353

(22) Filed: Dec. 21, 2021

(65) Prior Publication Data

US 2023/0059572 A1 Feb. 23, 2023

(30) Foreign Application Priority Data

Aug. 17, 2021 (JP) ................................. 2021-132569

(51) Int. Cl.
*H04N 1/00* (2006.01)
*H04N 1/32* (2006.01)

(52) U.S. Cl.
CPC ..... *H04N 1/32432* (2013.01); *H04N 1/00212* (2013.01); *H04N 1/00244* (2013.01); *H04N 1/00344* (2013.01); *H04N 2201/0017* (2013.01)

(58) Field of Classification Search
None
See application file for complete search history.

(56) References Cited

U.S. PATENT DOCUMENTS

| 9,401,812 | B1* | 7/2016 | Jachner | H04L 51/043 |
| 2009/0265433 | A1* | 10/2009 | Wu | H04L 51/18 |
| | | | | 709/206 |
| 2018/0052941 | A1* | 2/2018 | Codignotto | G06F 16/986 |
| 2019/0386949 | A1* | 12/2019 | Vennam | H04L 65/403 |
| 2021/0099608 | A1* | 4/2021 | Kamihisa | H04N 1/32767 |
| 2021/0120144 | A1* | 4/2021 | Takahashi | H04N 1/32128 |
| 2021/0160393 | A1* | 5/2021 | Sugita | H04N 1/00472 |
| 2021/0195060 | A1* | 6/2021 | Hasegawa | H04L 63/08 |
| 2022/0217247 | A1* | 7/2022 | Kamihisa | H04L 51/10 |

FOREIGN PATENT DOCUMENTS

JP    2009-232316 A    10/2009

\* cited by examiner

*Primary Examiner* — Henok Shiferaw
(74) *Attorney, Agent, or Firm* — Sughrue Mion, PLLC (57) ABSTRACT

An information processing apparatus includes a processor configured to: extract, if a facsimile document is received, information indicating a contact associated in advance with a telephone number of a person who has transmitted the facsimile document; and perform control for posting an electronic document, which is obtained by digitizing the facsimile document, to a message exchange service including the contact as a member while determining the contact as a notification target of the electronic document.

12 Claims, 10 Drawing Sheets

INFORMATION PROCESSING APPARATUS, INFORMATION PROCESSING SYSTEM, AND NON-TRANSITORY COMPUTER READABLE MEDIUM FOR NOTIFYING CONTACTS OF RECEIPT OF A FACSIMILE DOCUMENT

CROSS-REFERENCE TO RELATED APPLICATIONS

This application is based on and claims priority under 35 USC 119 from Japanese Patent Application No. 2021-132569 filed Aug. 17, 2021.

BACKGROUND

(i) Technical Field

The present disclosure relates to an information processing apparatus, an information processing system, and a non-transitory computer readable medium.

(ii) Related Art

Operations employing facsimiles, including domestic ordering operations, remain persistently even today, when communication methods such as email and social networking services (SNSs) have become commonplace, and related technologies also exist (e.g., refer to Japanese Unexamined Patent Application Publication No. 2009-232316).

SUMMARY

Information that can be automatically obtained when a facsimile document is received, however, is limited to, for example, a telephone number of a person who has transmitted the facsimile document and a time at which the facsimile document has been received. In an organization that shares the same facsimile number between plural departments or members of the departments, therefore, a person for whom a received facsimile document is intended is identified by trial and error while referring to an address or the like described in the facsimile document. Consequently, the progress of operations is difficult to grasp or manage, which often leads to human errors.

Aspects of non-limiting embodiments of the present disclosure relate to prevention of human errors by making it easier to grasp the progress of operations employing facsimiles.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: extract, if a facsimile document is received, information indicating a contact associated in advance with a telephone number of a person who has transmitted the facsimile document; and perform control for posting an electronic document, which is obtained by digitizing the facsimile document, to a message exchange service including the contact as a member while determining the contact as a notification target of the electronic document.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail hereinafter with reference to the accompanying drawings.

Configuration of Information Processing System

Figure 1:
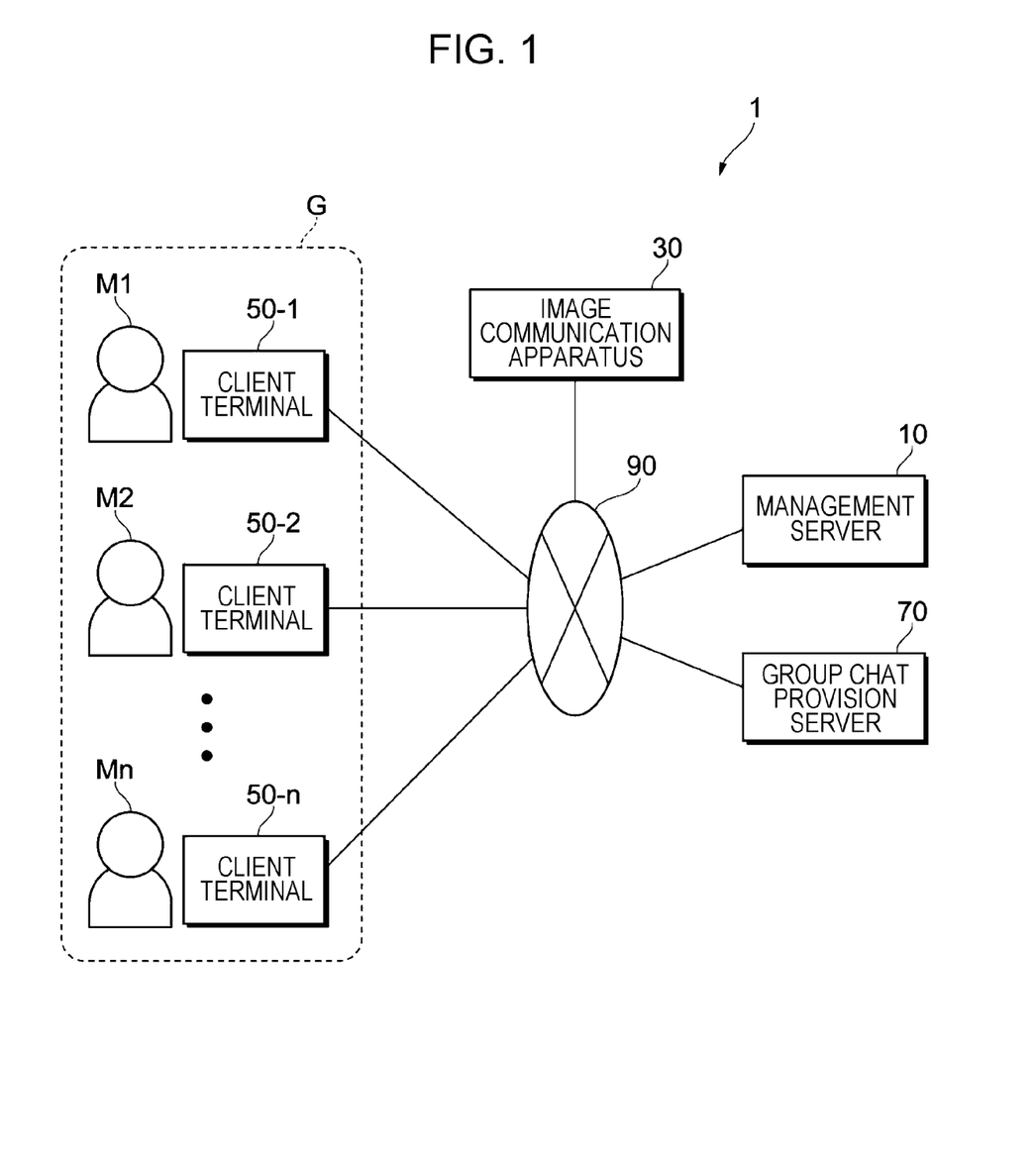
FIG. 1 is a diagram illustrating the overall configuration of an information processing system according to an exemplary embodiment.

FIG. 1 is a diagram illustrating the overall configuration of an information processing system 1 according to the present exemplary embodiment.

The information processing system 1 includes a management server 10, an image communication apparatus 30, client terminals 50-1 to 50-$n$ ($n$ is an integer larger than or equal to 2), and a group chat provision server 70 connected to one another over a network 90. Although FIG. 1 illustrates only one image communication apparatus 30 and only one group chat provision server 70, plural image communication apparatuses 30 and plural group chat provision servers 70 may be connected to the network 90, instead. The network 90 is, for example, a local area network (LAN), the Internet, or a telephone line.

The management server 10 is an information processing apparatus that is a server which manages the entirety of the information processing system 1. When the image communication apparatus 30 receives a facsimile document, for example, the management server 10 obtains information regarding the reception from the image communication apparatus 30 and identifies notification targets of the facsimile document. The management server 10 then transmits information regarding the identified notification targets to the image communication apparatus 30. The management server 10 also obtains, from the group chat provision server 70, information regarding a message posted in a group chat, identifies the message, and provides a result of the identification for the image communication apparatus 30.

In the present exemplary embodiment, "notification targets" of a facsimile document refer to addresses specified when the facsimile document is posted in a group chat. "Contacts" for a facsimile document refer to one or more members M who are to receive the facsimile document. For example, one or more members M who are to receive an order form received as a facsimile document and one or more members M who are to create an estimate are examples of the contacts.

The image communication apparatus 30 is an information processing apparatus that communicates electronic documents over the network 90. In the present exemplary embodiment, electronic documents are communicated using facsimile, a message exchange service, email, or the like. The message exchange service enables users to have a group chat. The electronic documents communicated over the network 90 are content of electronic media. Electronic documents include, for example, document files and image files (still images and moving images) generated or obtained by, or stored in advance in, the client terminals 50-1 to 50-n. Document files and image files generated by reading, using the image communication apparatus 30, documents recorded on a recording medium such as sheets of paper and document files and image files stored in the image communication apparatus 30 in advance are also examples of the electronic documents.

The client terminals 50-1 to 50-n are information processing apparatuses, such as smartphones, personal computers, or tablet terminals, used by members M1 to Mn, respectively, of a group G. The client terminals 50-1 to 50-n display group chat screens used by the members M1 to Mn, respectively. In the following description, the client terminals 50-1 to 50-n and the members M1 to Mn will be referred to as "client terminals 50" and "members M", respectively, when the client terminals 50-1 to 50-n and the members M1 to Mn need not be distinguished from one another. Although FIG. 1 illustrates only one group G consisting of the members M1 to Mn, plural groups G may exist, instead. In this case, one member M may belong to plural groups G.

The group chat provision server 70 is an information processing apparatus that is a server which enables the members M to have a group chat. When a message is posted to a thread of a group chat, the group chat provision server 70 transmits information regarding the message to the management server 10 as message information. A person who manages the group chat provision server 70 may be the same as or different from a person who manages the management server 10.

Hardware Configuration of Management Server

Figure 2:
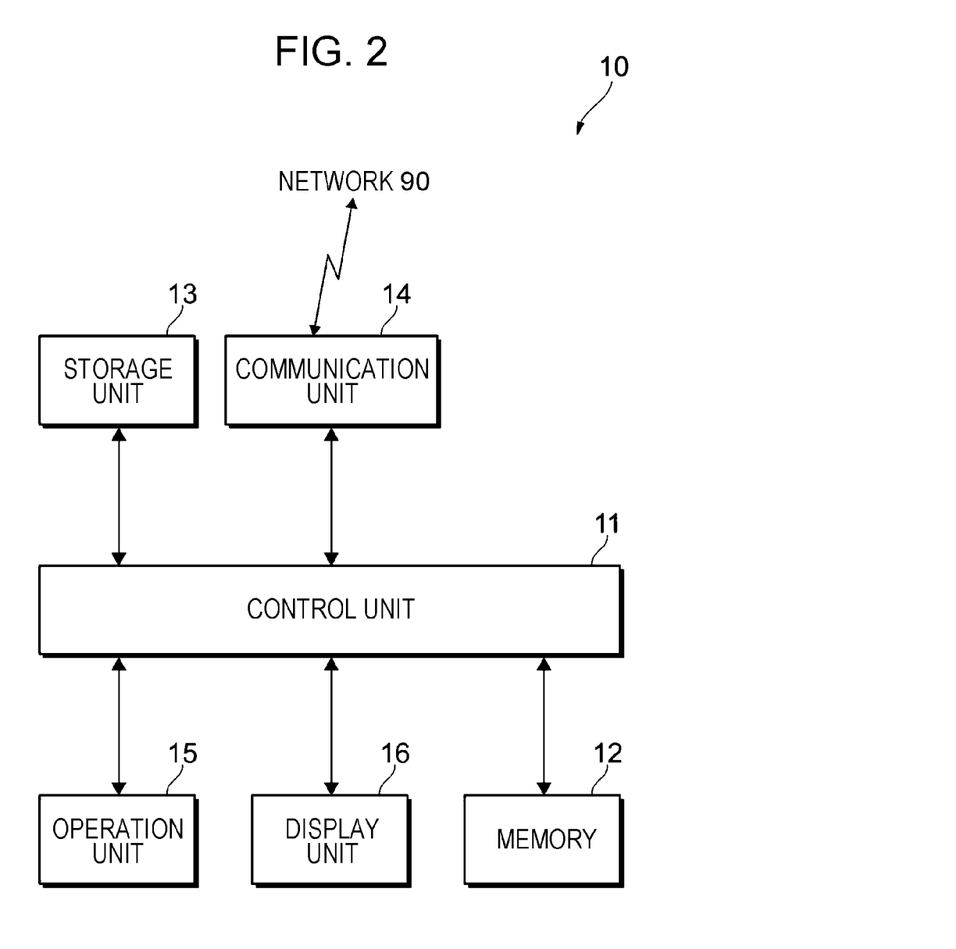
FIG. 2 is a diagram illustrating the hardware configuration of a management server.

FIG. 2 is a diagram illustrating the hardware configuration of the management server 10.

The management server 10 includes a control unit 11, a memory 12, a storage unit 13, a communication unit 14, an operation unit 15, and a display unit 16. These components are connected to one another by a data bus, an address bus, a peripheral component interconnect (PCI) bus, or the like.

The control unit 11 is a processor that controls the operation of the management server 10 by executing various pieces of software such as an operating system (OS; basic software) and application software (applied software). The control unit 11 is achieved, for example, by a central processing unit (CPU). The memory 12 is a storage area storing the various pieces of software, data used to execute the various pieces of software, and the like and used as a working area during processing. The memory 12 is achieved, for example, by a random-access memory (RAM).

The storage unit 13 is a storage area storing data input to the various pieces of software, data output from the various pieces of software, and the like. The storage unit 13 stores a database storing various pieces of information. The storage unit 13 is achieved, for example, by a hard disk drive (HDD), a solid-state drive (SSD), a semiconductor memory, or the like, which is used to store programs, various pieces of setting data, and the like. The communication unit 14 communicates data over the network 90. The communication unit 14 communicates data, for example, with the client terminals 50 and the group chat provision server 70.

The operation unit 15 is achieved, for example, by a keyboard, a mouse, mechanical buttons, and/or switches and receive input operations. The operation unit 15 includes a touch sensor that achieves a touch panel together with the display unit 16. The display unit 16 displays images and text information. The display unit 16 is achieved, for example, by a liquid crystal display or an organic electroluminescent (EL) display, which is used to display information.

Hardware Configuration of Image Communication Apparatus

Figure 3:
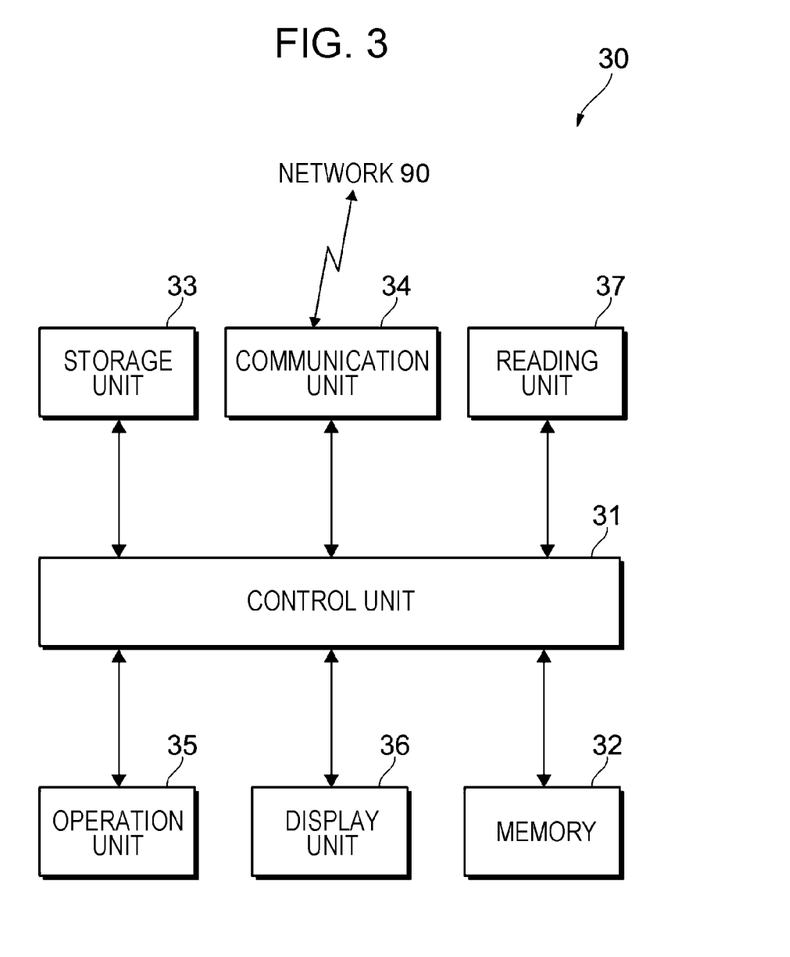
FIG. 3 is a diagram illustrating the hardware configuration of an image communication apparatus.

FIG. 3 is a diagram illustrating the hardware configuration of the image communication apparatus 30.

The image communication apparatus 30 has the same hardware configuration as the management server 10 illustrated in FIG. 2, except for a communication unit 34 and a reading unit 37. That is, the image communication apparatus 30 includes a control unit 31, which is achieved by a processor such as a CPU, a memory 32, which is achieved by a storage area such as a RAM, and a storage unit 33, which is achieved by a storage area such as an HDD, an SDD, or a semiconductor memory. The image communication apparatus 30 also includes an operation unit 35, which is achieved by a keyboard, a mouse, a touch panel, and/or the like, and a display unit 36, which is achieved by a liquid crystal display, an organic EL display, or the like. These components are connected to one another by a data bus, an address bus, a PCI bus, or the like.

The communication unit 34 communicates data with the management server 10, the client terminals 50, the group chat provision server 70, the outside, and the like over the network 90. When the network 90 is a telephone line, the communication unit 34 communicates facsimile documents with the outside.

The reading unit 37 reads documents recorded on a recording medium such as sheets of paper. The reading unit 37 is achieved, for example, by a charge-coupled device (CCD) scanner, which reduces, using lenses, light radiated from a light source and reflected from a document and receives the reduced light with CCDs, or a contact image sensor (CIS) scanner, which receives, with a CIS, light sequentially radiated from light-emitting diode (LED) light sources and reflected from a document.

Hardware Configuration of Client Terminals and Group Chat Provision Server

The hardware configuration of the client terminals 50 and the group chat provision server 70 is the same as that of the management server 10 illustrated in FIG. 2. Illustration and description of the hardware configuration of the client terminals 50 and the group chat provision server 70, therefore, is omitted.

Functional Configuration of Control Unit of Management Server

Figure 4:
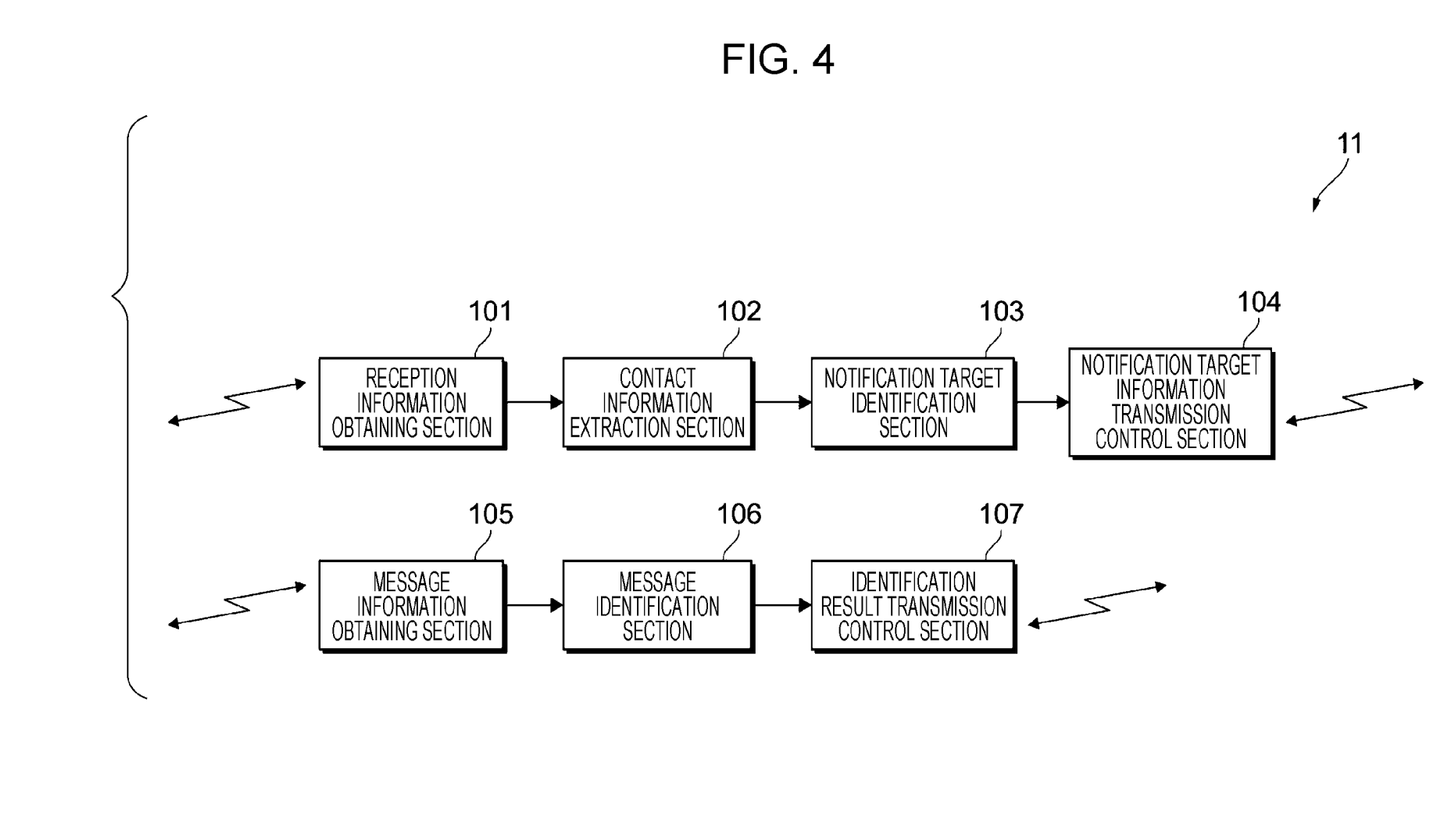
FIG. 4 is a diagram illustrating the functional configuration of a control unit of the management server.

FIG. 4 is a diagram illustrating the functional configuration of the control unit 11 of the management server 10.

In the control unit 11 of the management server 10, a reception information obtaining section 101, a contact information extraction section 102, a notification target identification section 103, a notification target information transmission control section 104, a message information obtaining section 105, a message identification section 106, and an identification result transmission control section 107 function.

The reception information obtaining section 101 obtains reception information transmitted from the image communication apparatus 30. The "reception information" refers to information regarding facsimile reception. Reception information includes information such as a telephone number of a person who has transmitted a facsimile document and a time at which the facsimile document has been received. In the present exemplary embodiment, telephone numbers of persons who has transmitted facsimile documents and contact information indicating contacts who are to receive the facsimile documents are associated with each other in the database of the storage unit 13.

The contact information extraction section 102 extracts, from the contact information stored in the database of the storage unit 13, a piece of contact information corresponding to a telephone number of a person who has transmitted a facsimile document. The extracted piece of contact information includes information with which one or more members M who are contacts to receive the facsimile document can be identified.

If there is no piece of contact information corresponding to a telephone number of a person who has transmitted a facsimile document in the contact information stored in the database of the storage unit 13, the contact information extraction section 102 extracts a predetermined piece of contact information. The predetermined piece of contact information is, for example, information with which one or more members M belonging to a department that is to receive orders from clients can be identified.

The notification target identification section 103 identifies contacts who are notification targets of a facsimile document received by the image communication apparatus 30. More specifically, the notification target identification section 103 identifies one or more members M who are notification targets on the basis of a piece of contact information extracted by the contact information extraction section 102.

The notification target information transmission control section 104 performs control for transmitting information regarding notification targets identified by the notification target identification section 103 to the image communication apparatus 30 as notification target information, in order for the image communication apparatus 30 to post a message for contacts who are the notification targets.

The message information obtaining section 105 obtains, as message information, information regarding a message posted in a group chat, the information being transmitted from the group chat provision server 70 when the message is posted to a thread of the group chat. Message information obtained by the message information obtaining section 105 includes information necessary to determine attributes of a message posted in a group chat, such as a time at which the message has been posted, a person who has posted the message, destinations of the message, content of the message, and whether an electronic document is attached to the message.

The message information obtaining section 105 may obtain message information at any time. For example, the message information obtaining section 105 may obtain message information each time a message is posted in a group chat. Alternatively, the message information obtaining section 105 may obtain message information at predetermined time intervals (e.g., every 30 minutes, every 2 hours, etc.). The message information obtained by the message information obtaining section 105 is stored in the database of the storage unit 13.

The message identification section 106 identifies attributes of a message posted in a group chat on the basis of message information obtained by the message information obtaining section 105. For example, the message identification section 106 determines whether a message posted in a group chat has been posted by the image communication apparatus 30 for the purpose of notifying contacts of a facsimile document.

It is assumed that, as a result of identification performed by the message identification section 106, messages posted in a group chat include ones posted by the image communication apparatus 30 for the purpose of notifying contacts of facsimile documents. In this case, the message identification section 106 further determines whether the messages posted by the image communication apparatus 30 for the purpose of notifying contacts of facsimile documents include one without a reply even after the elapse of a predetermined period of time from posting of the message in the group chat. Whether the predetermined period of time has elapsed is determined on the basis of a time at which a message has been posted, the time being included in the message information stored in the database of the storage unit 13.

In addition, for example, the message identification section 106 determines whether a message posted in a group chat is a first reply from contacts identified as notification targets of a facsimile document to the image communication apparatus 30. In addition, for example, the message identification section 106 determines whether a message posted in a group chat is requesting the image communication apparatus 30 to transmit a facsimile document.

The identification result transmission control section 107 performs control for transmitting results of identification of messages performed by the message identification section 106 to the image communication apparatus 30. For example, the identification result transmission control section 107 performs control for transmitting, to the image communication apparatus 30 as a result of identification of a message performed by the message identification section 106, information regarding, among messages posted by the image communication apparatus 30 for the purpose of notifying contacts of facsimile documents, a message without a reply even after the elapse of a predetermined period of time from posting of the message.

In addition, for example, the identification result transmission control section 107 performs control for transmitting, to the image communication apparatus 30 as a result of identification of a message performed by the message identification section 106, information regarding a message that is a first reply from contacts identified as notification targets of a facsimile document to the image communication apparatus 30.

In addition, for example, the identification result transmission control section 107 performs control for transmitting, to the image communication apparatus 30 as a result of identification of a message performed by the message identification section 106, information regarding a message posted to request the image communication apparatus 30 to transmit a facsimile document.

Functional Configuration of Image Communication Apparatus

Figure 5:
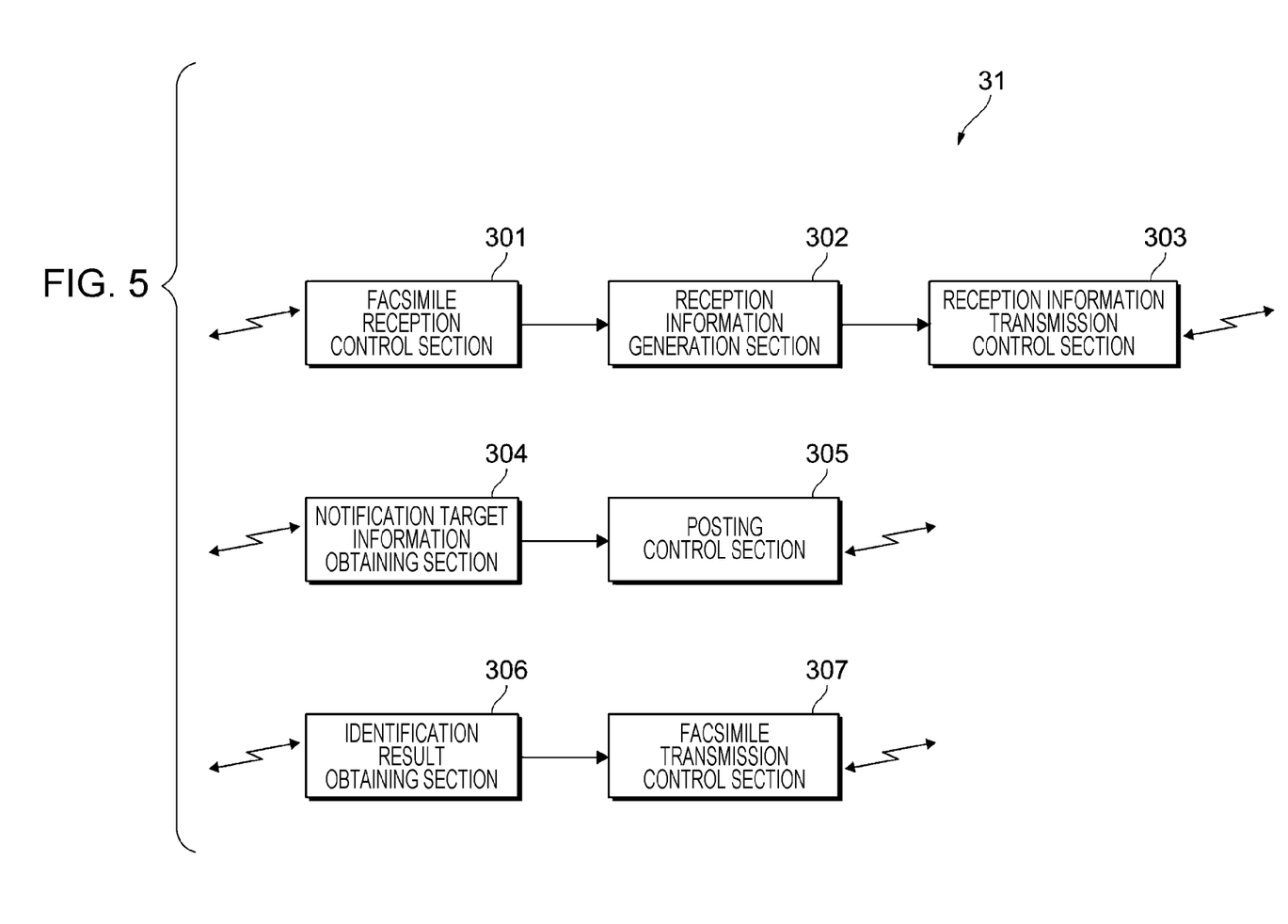
FIG. 5 is a diagram illustrating the functional configuration of a control unit of the image communication apparatus.

FIG. 5 is a diagram illustrating the functional configuration of the image communication apparatus 30.

In the control unit 31 of the image communication apparatus 30, a facsimile reception control section 301, a reception information generation section 302, a reception information transmission control section 303, a notification target information obtaining section 304, a posting control section 305, an identification result obtaining section 306, and a facsimile transmission control section 307 function.

The facsimile reception control section 301 performs control for receiving, with the communication unit 34, a facsimile document transmitted from the outside. A facsimile document received as a result of the control performed by the facsimile reception control section 301 is converted into a format attachable to a message posted in a group chat and saved. "Converted into a format attachable to a message" refers to, for example, conversion into a portable document format (PDF) file or the like.

When a facsimile document is received as a result of control performed by the facsimile reception control section 301, the reception information generation section 302 generates reception information, which is information regarding facsimile reception. The reception information transmission control section 303 performs control for transmitting reception information generated by the reception information generation section 302 to the management server 10. As described above, the reception information transmitted to the management server 10 includes information necessary for the management server 10 to identify notification targets, such as a telephone number of a person who has transmitted a facsimile document and a time at which the facsimile document has been received.

The notification target information obtaining section 304 obtains notification target information transmitted from the management server 10. As described above, since notification target information includes information regarding one or more members M who are notification targets of a received facsimile document, a message can be posted in a group chat for the one or more members M identified with the notification target information.

The posting control section 305 performs control for posting, to a thread of a group chat, a message to which an electronic document, which is a digitized facsimile document, is attached. The image communication apparatus 30 is authorized in advance to participate in a group chat. The image communication apparatus 30, therefore, can post messages to a thread of a group chat and be specified as a destination of messages as with the members M1 to Mn.

When posting this message, the posting control section 305 creates a new thread. Each time a facsimile document is received, therefore, a new thread corresponding to the facsimile document is automatically created. Notification targets of a message to which an electronic document, which is a digitized facsimile document, is attached are one or more members M identified with notification information obtained by the notification target information obtaining section 304. Specific examples of a group chat in which a message posted by the posting control section 305 is displayed will be described later with reference to FIGS. 9 and 10.

If a result of identification obtained by the identification result obtaining section 306 is information regarding, among messages posted by the image communication apparatus 30 for the purpose of notifying contacts of facsimile documents, a message without a reply even after the elapse of a predetermined period of time from posting of the message, the posting control section 305 reposts the message for contacts. The reposting reminds the contacts of the message.

The identification result obtaining section 306 obtains a result of identification transmitted from the management server 10. Examples of the result of identification transmitted from the management server 10 include information regarding, among messages posted by the image communication apparatus 30 for the purpose of notifying contacts of facsimile documents, a message without a reply even after the elapse of a predetermined period of time from posting of the message, information regarding a message that is a first reply posted to the image communication apparatus 30 from contacts identified as notification targets of a facsimile document, and information regarding a message posted to request the image communication apparatus 30 to transmit a facsimile document.

The facsimile transmission control section 307 performs control for transmitting a facsimile document to the outside from the communication unit 34 over the network 90 (a telephone line in this case) on the basis of a result of identification obtained by the identification result obtaining section 306. It is assumed, for example, that a result of identification is information regarding a message that is a first reply posted to the image communication apparatus 30 from contacts identified as notification targets of a facsimile document. In this case, the facsimile transmission control section 307 transmits, to a person who has placed an order, a facsimile document for expressing gratitude for the order. In the present exemplary embodiment, this kind of facsimile document will be referred to as a "thank you fax".

It is assumed, for example, that a result of identification is information regarding a message posted to request the image communication apparatus 30 to transmit a facsimile document. In this case, the facsimile transmission control section 307 performs control for transmitting a requested facsimile document to the outside from the communication unit 34 over the network 90 (a telephone line in this case).

When the image communication apparatus 30 is requested, using a message, to transmit a facsimile document, for example, an electronic document obtained by digitizing a target facsimile document may be attached to a reply message. Alternatively, for example, information for accessing an electronic document obtained by digitizing a target facsimile document may be displayed as a message. The information for accessing an electronic document may be, for example, a unique resource locator (URL). The target facsimile document may be, for example, an estimate or an order form.

When transmitting a facsimile document, the facsimile transmission control section 307 may require prior approval from a member M other than a member M who has requested the transmission of the facsimile document. Any method may be used to give prior approval. For example, a member M may give prior approval by performing a predetermined input operation on a message for requesting transmission of a facsimile document. In this case, the predetermined operation may be, for example, an operation for pressing a so-called "Like" button provided for the message for requesting transmission of a facsimile document.

Processes Performed by Management Server

Figure 6:
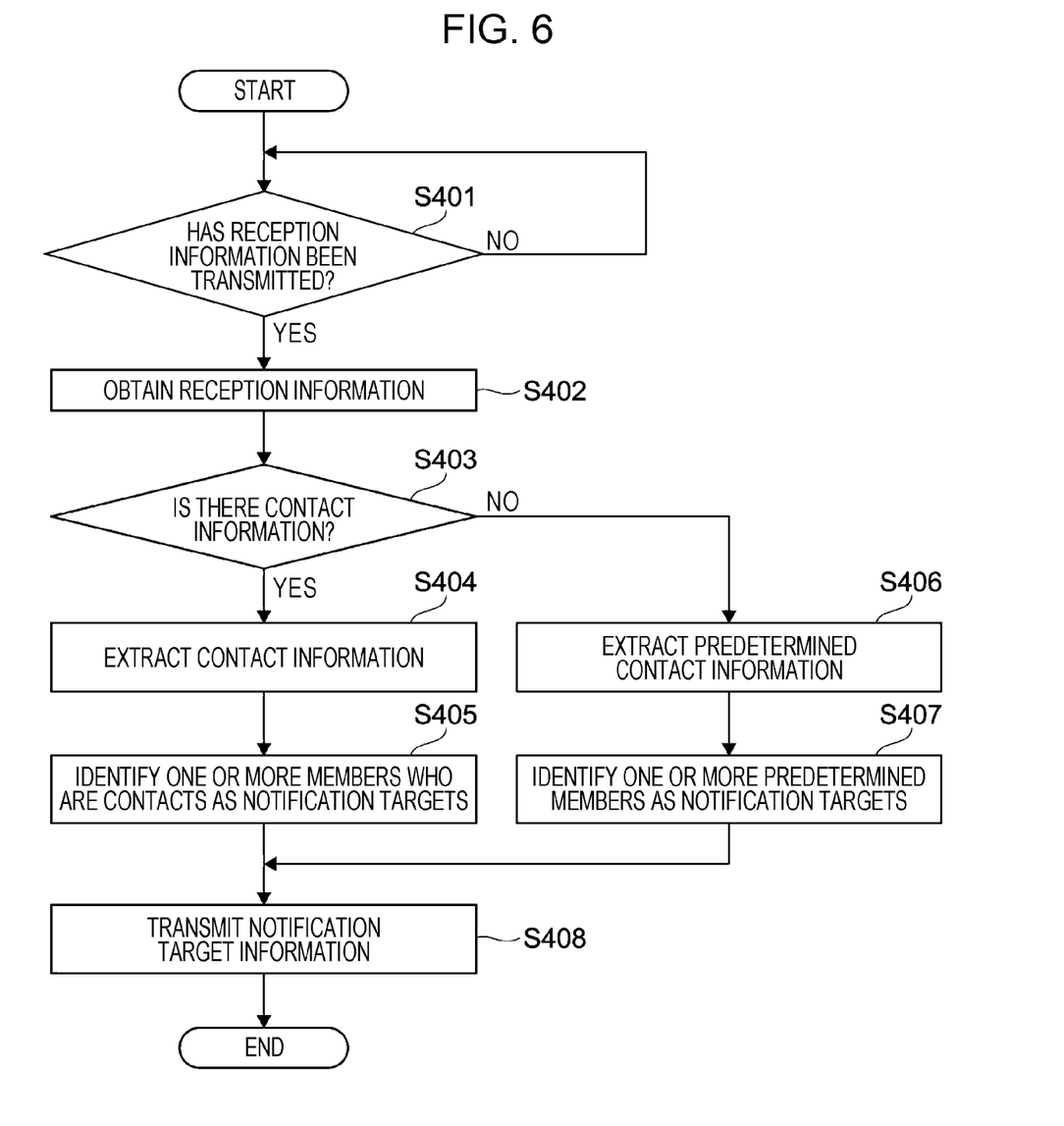
FIG. 6 is a flowchart illustrating a process performed by the management server when the image communication apparatus receives a facsimile document.
Figure 7:
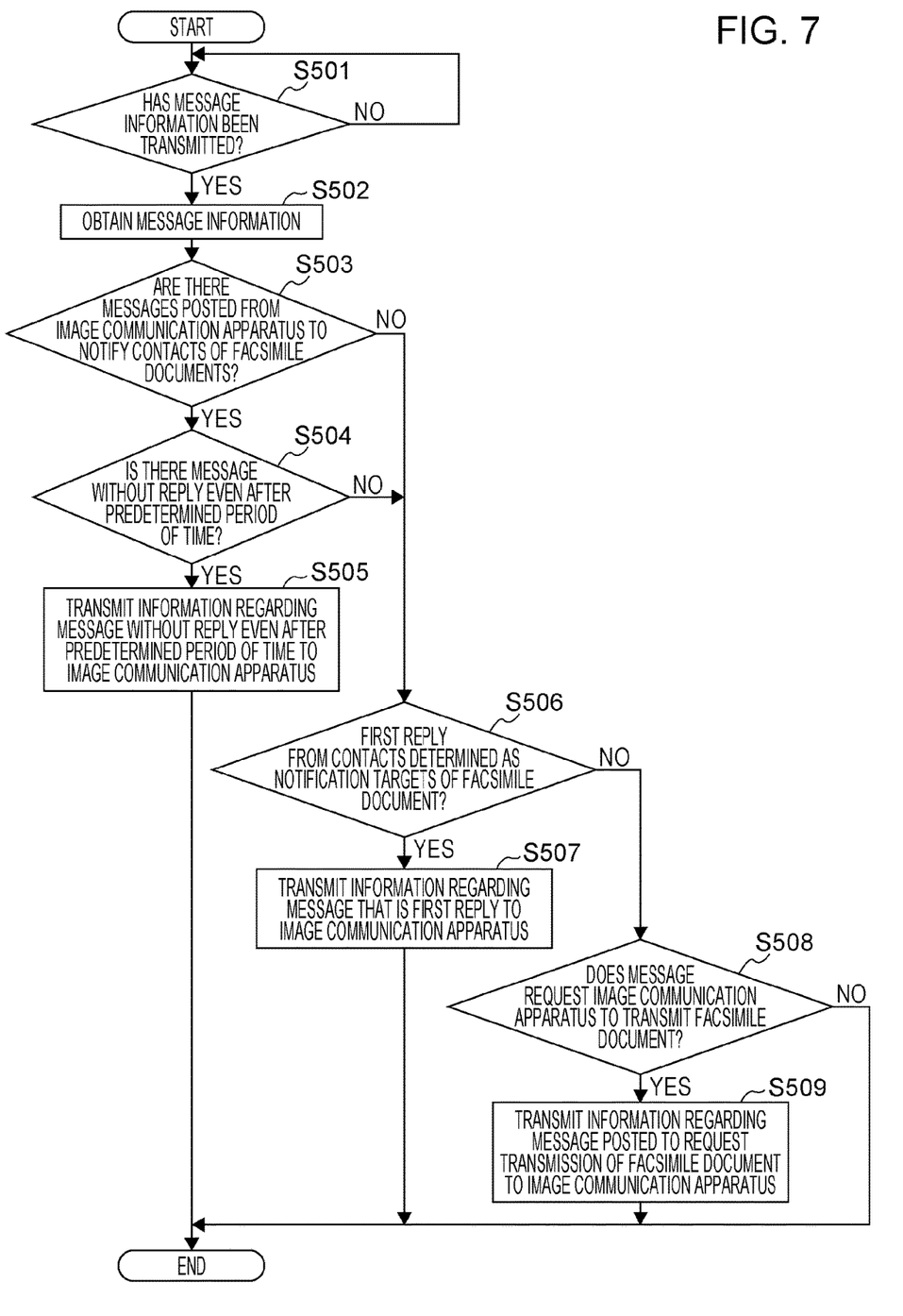
FIG. 7 is a flowchart illustrating a process performed by the management server when a message is posted to a thread of a group chat.

FIGS. 6 and 7 are flowcharts illustrating processes performed by the management server 10.

FIG. 6 illustrates a process performed by the management server 10 at a time when the image communication apparatus 30 receives a facsimile document. As illustrated in FIG. 6, if the management server 10 receives reception information, which is information regarding facsimile reception, from the image communication apparatus 30 (YES in step S401), the management server 10 obtains the reception information (step S402).

If the management server 10 has not received reception information from the image communication apparatus 30 (NO in step S401), on the other hand, the management server 10 repeats step S401 until the management server 10 receives reception information from the image communication apparatus 30.

If there is a piece of contact information corresponding to a telephone number of a person who has transmitted the facsimile document in the contact information stored in the database of the storage unit 13 (YES in step S403), the management server 10 extracts the piece of contact information (step S404) and identifies one or more members M who are contacts as notification targets (step S405).

If there is no piece of contact information corresponding to the telephone number of the person who has transmitted the facsimile document in the contact information stored in the database of the storage unit 13 (NO in step S403), the management server 10 extracts a predetermined piece of contact information (step S406) and identifies one or more members M who are predetermined contacts as notification targets (step S407). For example, the management server 10 identifies, as notification targets, one or more members M belonging to a department that is to receive orders from clients.

The management server 10 performs control for transmitting information regarding the identified notification targets to the image communication apparatus 30 as notification target information (step S408). The process performed by the management server 10 when the image communication apparatus 30 receives a facsimile document thus ends.

FIG. 7 illustrates a process performed by the management server 10 when a message is posted to a thread of a group chat. As illustrated in FIG. 7, if the management server 10 receives message information from the group chat provision server 70 (YES in step S501), the management server 10 obtains the message information (step S502).

If the management server 10 has not received message information from the group chat provision server 70 (NO in step S501), on the other hand, the management server 10 repeats step S501 until the management server 10 receives message information from the group chat provision server 70.

The management server 10 identifies a message posted in a group chat on the basis of the obtained message information. If it is determined as a result of the identification of a message performed by the management server 10 that posted messages include messages posted by the image communication apparatus 30 to notify contacts of facsimile documents (YES in step S503), and if the messages posted by the image communication apparatus 30 to notify contacts of facsimile documents include a message without a reply even after the elapse of a predetermined period of time (YES ins step S504), the management server 10 performs control for transmitting, to the image communication apparatus 30, information regarding the message without a reply even after the elapse of the predetermined period of time (step S505).

If the messages posted in the group chat do not include messages posted by the image communication apparatus 30 to notify contacts of facsimile documents (NO in step S503), or if the messages posted by the image communication apparatus 30 to notify contacts of facsimile documents do not include a message without a reply even after the elapse of the predetermined period of time (NO in step S504), on the other hand, the process performed by the management server 10 proceeds to step S506.

If it is determined as a result of the identification of the message performed by the management server 10 that the message posted in the group chat is a first reply from the contacts identified as the notification targets of the facsimile document (YES in step S506), the management server 10 performs control for transmitting, to the image communication apparatus 30, information regarding the message that is the first reply posted to the image communication apparatus 30 from the contacts identified as the notification targets of the facsimile document as a result of the identification of the message (step S507).

If the message posted in the group chat is not a first reply from the contacts identified as the notification targets of the facsimile document (NO in step S506), on the other hand, the process performed by the management server 10 proceeds to step S508.

If it is determined as a result of the identification of the message performed by the management server 10 that the message posted in the group chat is requesting the image communication apparatus 30 to transmit a facsimile document (YES in step S508), the management server 10 performs control for transmitting, to the image communication apparatus 30, information regarding the message posted to request the image communication apparatus 30 to transmit a facsimile document as a result of the identification of the message (step S509).

If the message posted in the group chat is not requesting the image communication apparatus 30 to transmit a facsimile document (NO in step S508), on the other hand, the process performed by the management server 10 ends.

Process Performed by Image Communication Apparatus

Figure 8:
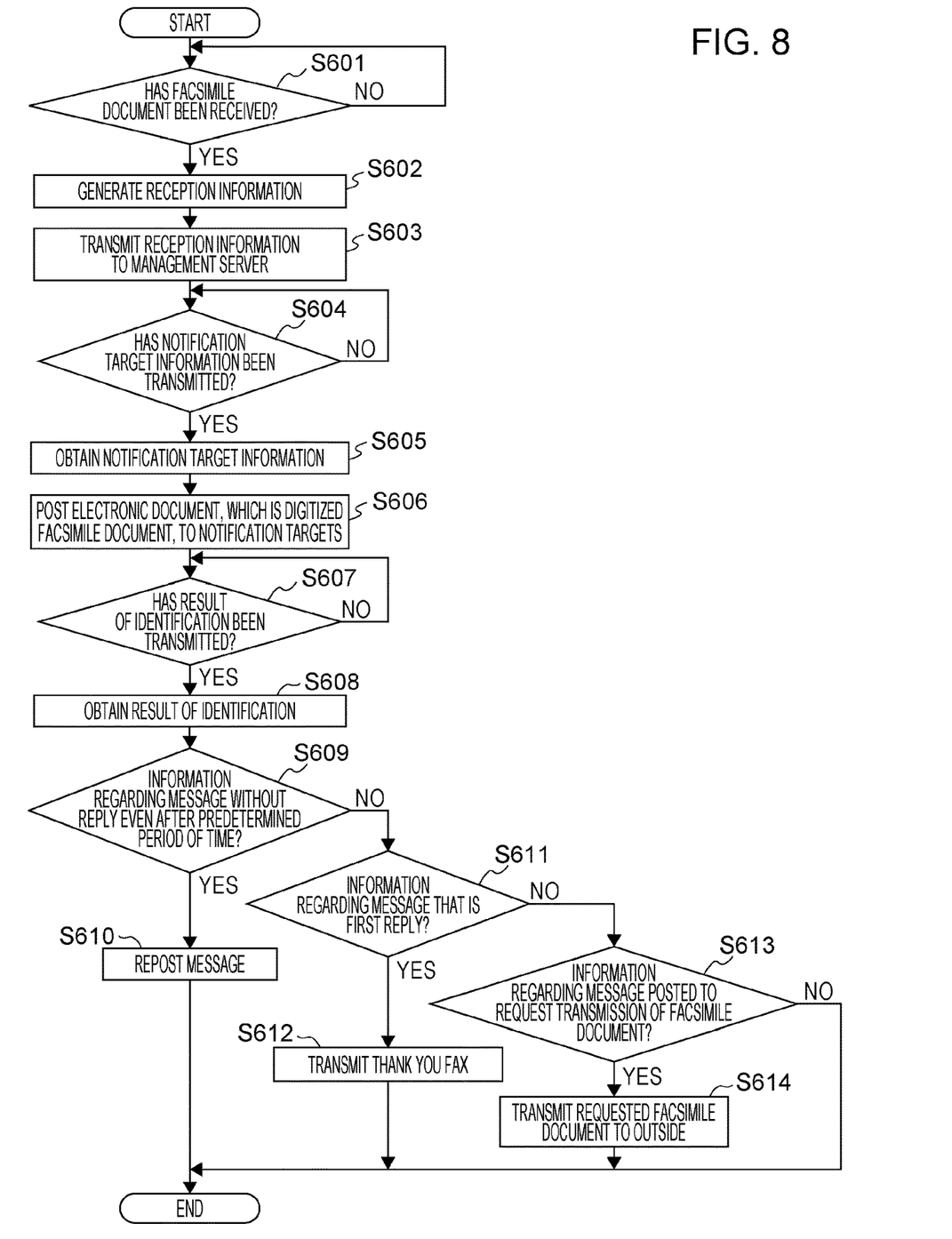
FIG. 8 is a flowchart illustrating a process performed by the image communication apparatus when a facsimile document is transmitted to the image communication apparatus from the outside.

FIG. 8 is a flowchart illustrating a process performed by the image communication apparatus 30.

FIG. 8 illustrates a process performed by the image communication apparatus 30 when a facsimile document is transmitted to the image communication apparatus 30 from the outside. As illustrated in FIG. 8, if the image communication apparatus 30 receives a facsimile document transmitted from the outside (YES in step S601), the image communication apparatus 30 generates reception information, which is information regarding facsimile reception (step S602).

The image communication apparatus 30 performs control for transmitting the reception information generated in step S602 to the management server 10 (step S603). If the image communication apparatus 30 has not received a facsimile document from the outside (NO in step S601), on the other hand, the image communication apparatus 30 repeats step S601 until a facsimile document is transmitted from the outside.

If the image communication apparatus 30 receives notification target information from the management server 10 (YES in step S604), the image communication apparatus 30 obtains the notification target information (step S605) and posts an electronic document obtained by digitizing the facsimile document for notification targets (step S606). If the image communication apparatus 30 has not received notification target information (NO in step S604), the image communication apparatus 30 repeats step S604 until the image communication apparatus 30 receives notification target information from the management server 10.

If the image communication apparatus 30 receives, from the management server 10, a result of identification of a message posted in a group chat (YES in step S607), the image communication apparatus 30 obtains the result of identification (step S608), and the process proceeds to step S609. If the image communication apparatus 30 has not received a result of identification from the management server 10 (NO in step S607), the image communication apparatus 30 repeats step S607 until the image communication apparatus 30 receives a result of identification of a message from the management server 10.

If the result of identification obtained by the image communication apparatus 30 is information regarding, among messages posted by the image communication apparatus 30 to notify contacts of facsimile documents, a message without a reply even after the elapse of a predetermined period of time from the posting of the message (YES in step S609), the image communication apparatus 30 reposts the message for the contacts (step S610). The reposted message may include information indicating a period of time that has elapsed since the previous posting.

If the result of identification obtained by the image communication apparatus 30 is not information regarding, among the messages posted by the image communication apparatus 30 to notify contacts of facsimile documents, a message without a reply even after the elapse of the predetermined period of time from the posting of the message (NO in step S609), the process performed by the image communication apparatus 30 proceeds to step S611.

If the result of identification obtained by the image communication apparatus 30 is information regarding a message that is a first reply posted to the image communication apparatus 30 from contacts identified as notification targets of the facsimile document (YES in step S611), the image communication apparatus 30 transmits a thank you fax to a person who has transmitted the facsimile document (step S612). The process performed by the image communication apparatus 30 thus ends.

If the result of identification obtained by the image communication apparatus 30 is not information regarding a message that is a first reply posted to the image communication apparatus 30 from the contacts identified as the notification targets of the facsimile document (NO in step S611), on the other hand, the process performed by the image communication apparatus 30 proceeds to step S613.

If the result of identification obtained by the image communication apparatus 30 is information regarding a message posted to request the image communication apparatus 30 to transmit a facsimile document (YES in step S613), the image communication apparatus 30 performs control for transmitting the requested facsimile document to the outside (step S614).

If the result of identification obtained by the image communication apparatus 30 is not information regarding a message posted to request the image communication apparatus 30 to transmit a facsimile document (NO in step S613), on the other hand, the process performed by the image communication apparatus 30 ends.

Specific Examples

Figure 9:
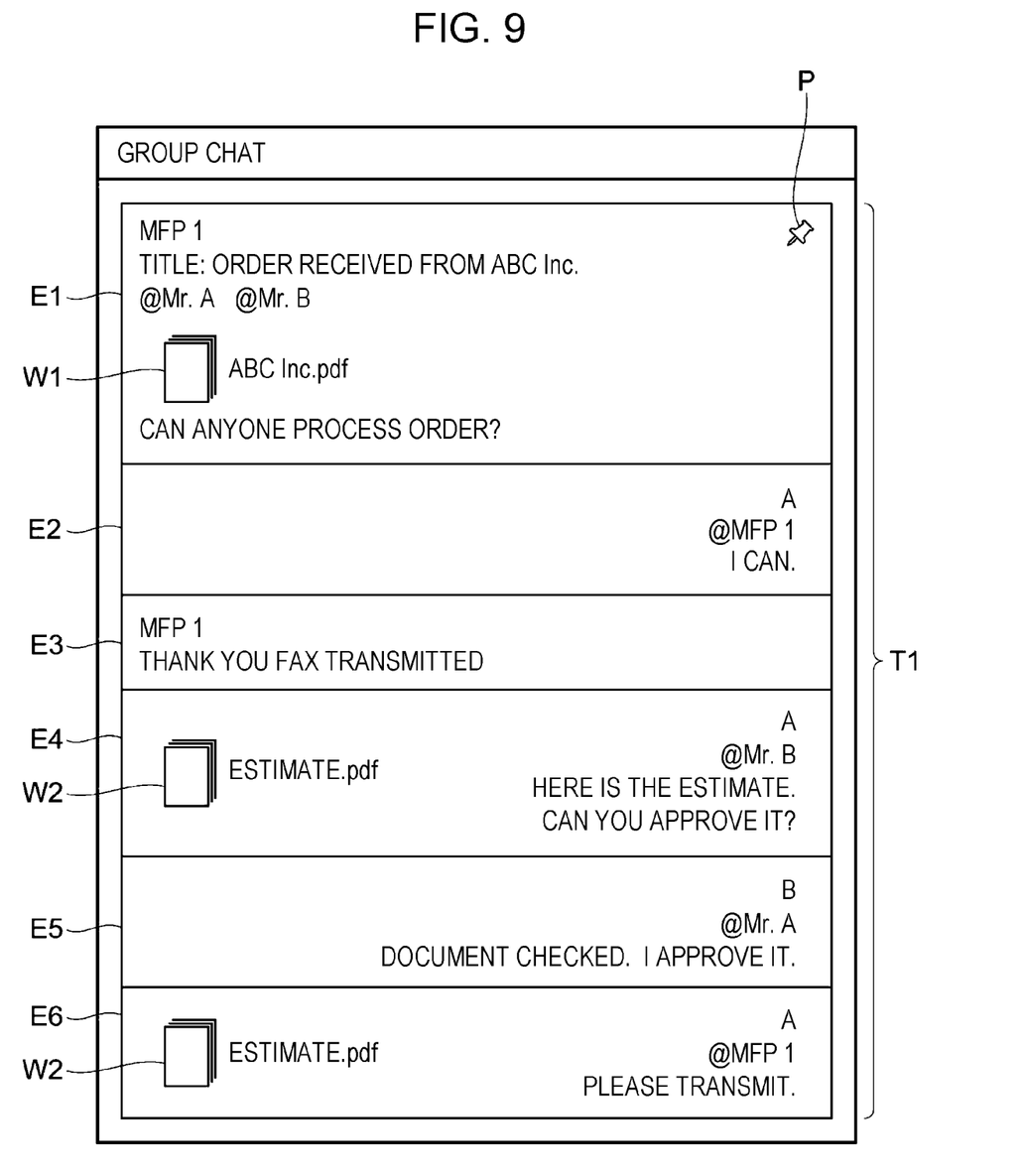
FIG. 9 is a diagram illustrating a specific example of a group chat screen displayed on display units of client terminals.
Figure 10:
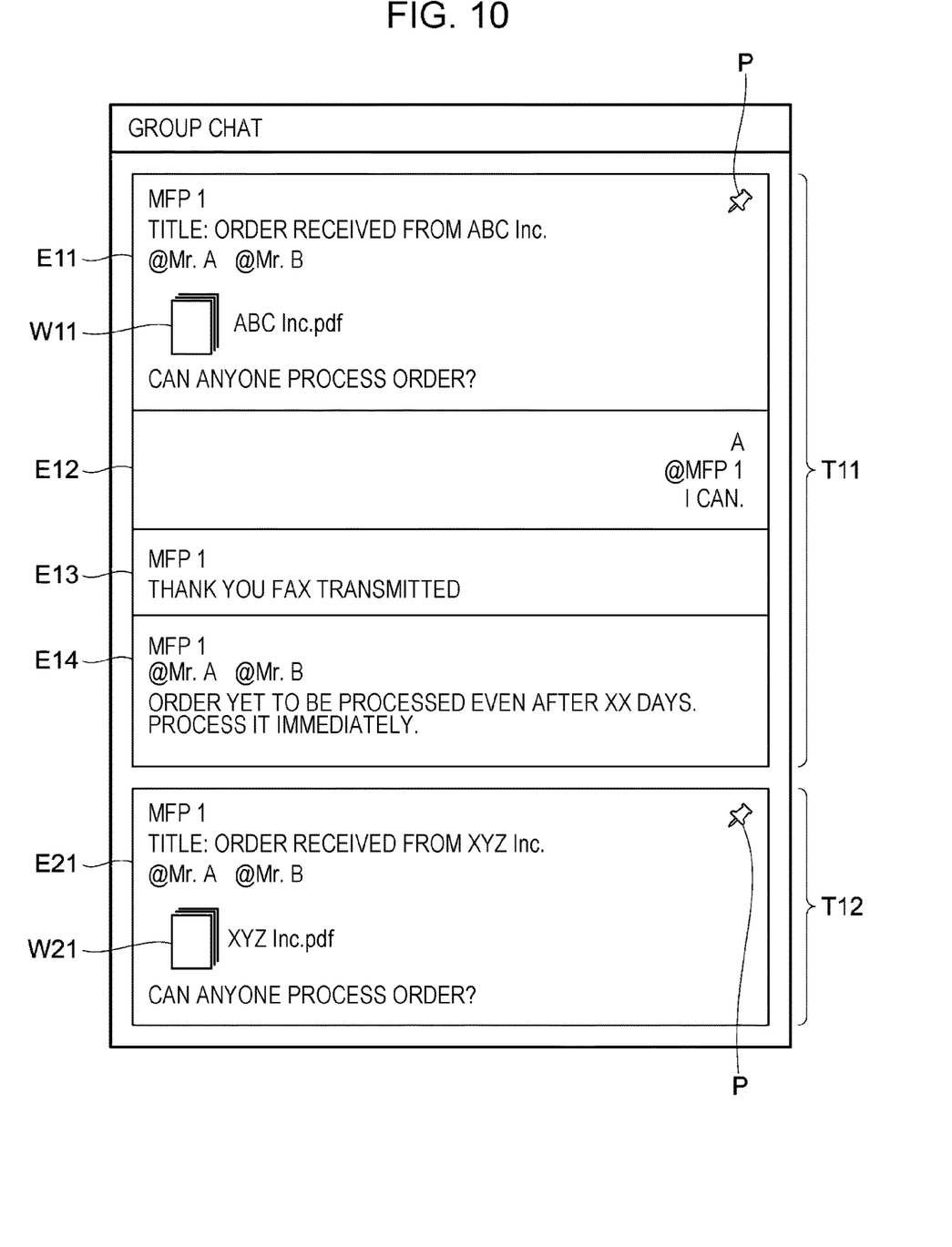
FIG. 10 is a diagram illustrating another specific example of the group chat screen displayed on the display units of the client terminals.

FIGS. 9 and 10 are diagrams illustrating specific examples a group chat screen displayed on display units of the client terminals 50.

The group chat screen displayed on the display units of the client terminals 50 include one or more threads T1 to Tp (p is an integer larger than or equal to 1), each of which includes one or more messages E1 to Em (m is an integer larger than or equal to 1). FIG. 9 illustrates an example of the thread T1 automatically created for a facsimile document when the image communication apparatus 30 receives the facsimile document from the outside. Messages E1 to E6 have been posted to the thread T1 in this order.

Among the messages E1 to E6, the message E1 has been posted, for contacts identified as notification targets, by the image communication apparatus 30 that has received the facsimile document from the outside. In the example illustrated in FIG. 9, the facsimile document received from the outside is an order form from a client.

The message E1 indicates that a sender thereof is "MFP 1", that a tile of the thread T1 is "Order received from ABC Inc.", and that contact members M identified as notification targets are "Mr. A" and "Mr. B". Text of the message E1 is "Can anyone process order?", and an electronic document W1 (a file name "ABC Inc.pdf"), which has been obtained by digitizing the order form received by facsimile, is attached to the message E1.

Among the messages E1 to E6, the message E2 is a reply message from one of the contacts identified as the notification targets of the facsimile document. The message E2 indicates that a sender thereof is "A" (member M) and that a notification target thereof is "MFP 1" (image communication apparatus 30). Text of the message E2 is "I can".

Among the messages E1 to E6, the message E3 has been posted by the image communication apparatus 30 to notify the members M of the group chat that the image communication apparatus 30 has transmitted a thank you fax. More specifically, the message E3 indicates that a sender thereof is "MFP 1" (image communication apparatus 30). Text of the message E3 is "Thank you fax transmitted".

Among the messages E1 to E6, the message E4 has been posted by one of the members M identified as the notification targets of the facsimile document to request the other member M (e.g., a superior) to approve an estimate created thereby. More specifically, the message E4 indicates that a sender thereof is "A" (member M), who has created an estimate, and that a notification target thereof is "B" (member M), who is to approve the estimate. Text of the message E4 is "Here is the estimate. Can you approve it?", and an electronic document W2 (a file name "estimate.pdf"), which has been obtained by digitizing the estimate created by "A" (member M), is attached to the message E4.

Among the messages E1 to E6, the message E5 has been posted by the member M who has been requested to approve the estimate to approve the estimate. More specifically, the message E5 indicates that a sender thereof is "B" (member M), who is approving the estimate, and that a notification target thereof is "A" (member M), who has created the estimate. Text of the message E5 is "Document checked. I approve it".

Among the messages E1 to E6, the message E6 has been posted by "A" (member M), who has created the estimate, to request the image communication apparatus 30 to transmit the estimate by facsimile. More specifically, the message E6 indicates that a sender thereof is "A" (member M), who has created the estimate, and that a notification target thereof is the image communication apparatus 30, which is being requested to transmit the estimate as a facsimile document. Text of the message E6 is "Please transmit", and the electronic document W2 (the file name "estimate.pdf"), which has been obtained by digitizing the estimate approved by "B" (member M), is attached to the message E6.

FIG. 10 illustrates, as another example of the group chat screen displayed on the display units of the client terminals 50, threads T11 and T12 automatically created for facsimile documents when the image communication apparatus 30 receives the facsimile documents from the outside. Messages E11 to E14 have been posted to the thread T11 in this order. A message E21 has been posted to the thread T12.

Among the messages E11 to E14 in the thread T11, the messages E11 to E13 are the same as the messages E1 to E3, respectively, in the thread T1 illustrated in FIG. 9. That is, the message E11 has been posted, for contacts identified as notification targets, by the image communication apparatus 30 that has received a facsimile document from the outside. The message E12 is a reply message from one of the contacts identified as the notification targets of the facsimile document. The message E13 has been posted by the image communication apparatus 30 to notify the members M of the group chat that the image communication apparatus 30 has transmitted a thank you fax.

Among the messages E11 to E14, the message E14 has been reposted by the image communication apparatus 30 as a reminder for the contacts identified as the notification targets of the facsimile document. The message E14 has been posted for contacts, as notification targets, of an order that has not been processed even after the elapse of a predetermined period of time from the reception, by the image communication apparatus 30, of the facsimile document from the outside.

More specifically, the message E14 indicates that a sender thereof is the image communication apparatus 30 (MFP 1) that has received the order form and that notification targets thereof are "A" (member M) and "B" (member M), who are contacts who are to receive the order form. Text of the message E14 is "Order yet to be processed even after XX days. Process it immediately". In this case, the predetermined period of time is XX days.

As with the message E11 in the thread T11, the message E21 in the thread T12 has been posted, for contacts identified as notification targets, by the image communication apparatus 30 that has received a facsimile document from the outside. In both the message E11 in the thread T11 and the message E21 in the thread T12, a sender is "MFP 1", contact members M identified as notification targets are "Mr. A" and "Mr. B", and text is "Can anyone process order?".

The threads T11 and T12, however, correspond to different order forms (facsimile documents). More specifically, a title of the thread T11 is "Order received from ABC Inc.", whereas a title of the thread T12 is "Order received from XYZ inc." In addition, a file name of an electronic document W11 attached to the message E11 in the thread T11 is "ABC Inc.pdf", whereas a file name of an electronic document W21 attached to the message E21 in the thread T12 is "XYZ Inc.pdf". The message E11 and the message E21, therefore, have been posted to different threads, namely the thread T11 and the thread T12, respectively.

In the present exemplary embodiment, when the image communication apparatus 30 receives an order form transmitted from the outside as a facsimile document, a thread such as the thread T1 illustrated in FIG. 9 or the thread T11 or T12 illustrated in FIG. 10 is thus automatically created for the order form, and an electronic document W1, which is obtained by digitizing the received order form, is posted. At this time, "A" (member M) and "B" (member M) who are contacts to receive the order form are identified as notification targets. "A" (member M) and "B" (member M), therefore, easily recognize that the order form has been received by facsimile just by viewing the automatically created thread.

In addition, according to the present exemplary embodiment, use of a thread makes it easier to, for example, transmit a thank you fax, approve an estimate corresponding to a received order form, transmit an approved estimate by facsimile, and manage the progress of an order that has not been processed. Furthermore, only unprocessed orders may be extracted and managed using a so-called "pinning" function, which employs a pin P illustrated in FIGS. 9 and 10, because pinned threads can be extracted later.

Although an exemplary embodiment has been described above, the present disclosure is not limited to the above exemplary embodiment, either. Effects produced by the present disclosure are not limited to those described in the above exemplary embodiment. For example, the system configuration illustrated in FIG. 1 and the hardware configurations illustrated in FIGS. 2 and 3 are examples, and a system configuration and hardware configurations used are not particularly limited. In addition, the functional configurations illustrated in FIGS. 4 and 5 are examples, and functional configurations used are not particularly limited. It is only required that the information processing system 1 illustrated in FIG. 1 have functions by which the above-described processes can be achieved, and functional configurations for achieving such functions are not limited to the examples illustrated in FIGS. 4 and 5.

The order of the steps included in the processes illustrated in FIGS. 6 to 8 is an example, and order in which the steps included in the processes illustrated in FIGS. 6 to 8 is not particularly limited. The steps need not necessarily be performed in time series in the illustrated order, and may be performed in parallel with one another or separately, instead. The screens illustrated in FIGS. 9 and 10 are examples of a service screen of a message exchange service, and the service screen of the message exchange service is not particularly limited. Any user interface capable of achieving the message exchange service may be employed.

Although the management server 10 identifies a message posted to a thread of a group chat in the above exemplary embodiment, the management server 10 need not identify a message. For example, the image communication apparatus 30 may singlehandedly identify a message posted to a thread of a group chat, instead. In this case, the message information obtaining section 105 and the message identification section 106 illustrated in FIG. 4, for example, may function not in the control unit 11 of the management server 10 but in the control unit 31 of the image communication apparatus 30, instead. In addition, a database in which telephone numbers of persons who have transmitted facsimile documents and contact information are associated with each other may be stored in the storage unit 33 of the image communication apparatus 30, instead.

In addition, although the image communication apparatus 30 transmits a thank you fax for expressing gratitude for an order to a client if the client transmits an order form as a facsimile document in the above exemplary embodiment, the image communication apparatus 30 need not necessarily transmit a thank you fax. When a client who has transmitted an order form owns an information processing apparatus capable of receiving an email over the network 90, the image communication apparatus 30 may transmit an email for expressing gratitude for an order to the client, instead.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
extract, if a facsimile document is received, information indicating a contact associated in advance with a telephone number of a person who has transmitted the facsimile document;
perform control for posting an electronic document, which is obtained by digitizing the facsimile document, to a message exchange service including the contact as a member while determining the contact as a notification target of the electronic document; and
perform, if a reply whose notification target is a person who has transmitted the electronic document is posted to the message exchange service, control for notifying the person who has transmitted the facsimile document that the contact has received the facsimile document.

2. The information processing apparatus according to claim 1,
wherein the processor is configured to perform, if a reply to the electronic document is not posted even after elapse of a predetermined period of time from posting of the electronic document, control for reposting the electronic document to the message exchange service.

3. The information processing apparatus according to claim 2,
wherein the processor is configured to perform, when reposting the electronic document, control for posting information indicating a period of time that has elapsed since reception of the facsimile document.

4. The information processing apparatus according to claim 1,
wherein a number of electronic documents and a number of threads of the message exchange service to which the electronic documents are posted are in a one-to-one relationship.

5. The information processing apparatus according to claim 1,
wherein the processor is configured to perform, if the reply is a first reply, control for notifying the person who has transmitted the facsimile document that the contact has received the facsimile document.

6. The information processing apparatus according to claim 5,
wherein the processor is configured to perform, using a predetermined communication method, control for notifying the person who has transmitted the facsimile document that the contact has received the facsimile document in the control for notifying the person who has transmitted the facsimile document that the contact has received the facsimile document.

7. The information processing apparatus according to claim 1,
wherein the processor is configured to perform, if the electronic document is posted as the reply, control for transmitting the electronic document to the person who has transmitted the facsimile document.

8. The information processing apparatus according to claim 7,
wherein the processor is configured to perform, if another member of the message exchange service checks the electronic document, control for providing the electronic document for the person who has transmitted the facsimile document in the control for transmitting the electronic document to the person who has transmitted the facsimile document.

9. The information processing apparatus according to claim 8,
wherein the processor is configured to perform, if the other member posts a message indicating completion of checking after checking the electronic document, control for providing the electronic document for the person who has transmitted the facsimile document.

10. The information processing apparatus according to claim 8,
wherein the processor is configured to perform, if the other member performs an input operation indicating completion of checking after checking the electronic document, control for providing the electronic document for the person who has transmitted the facsimile document.

11. An information processing system comprising:
extraction means for extracting, if a facsimile document is received, information indicating a contact associated in advance with a telephone number of a person who has transmitted the facsimile document;
posting control means for performing control for posting an electronic document, which is obtained by digitizing the facsimile document, to a message exchange service including the contact as a member while determining the contact as a notification target of the electronic document; and
notification control means for notifying, if a reply whose notification target is a person who has transmitted the electronic document is posted to the message exchange service, the person who has transmitted the facsimile document that the contact has received the facsimile document.

12. A non-transitory computer readable medium storing a program causing a computer to execute a process comprising:
extracting, if a facsimile document is received, information indicating a contact associated in advance with a telephone number of a person who has transmitted the facsimile document;
performing control for posting an electronic document, which is obtained by digitizing the facsimile document, to a message exchange service including the contact as a member while determining the contact as a notification target of the electronic document; and
performing, if a reply whose notification target is a person who has transmitted the electronic document is posted to the message exchange service, control for notifying the person who has transmitted the facsimile document that the contact has received the facsimile document.

\* \* \* \* \*